United States Patent [19]

Jenkner

[11] 3,725,316
[45] Apr. 3, 1973

[54] SELF-EXTINGUISHING POLYURETHANES CONTAINING BROMINATED BENZO-QUINONES

[75] Inventor: Herbert Jenkner, Cologne-Deutz, Germany

[73] Assignee: Chemische Fabrik Kalk GmbH

[22] Filed: July 1, 1970

[21] Appl. No.: 51,665

[30] Foreign Application Priority Data

Sept. 17, 1969 Germany.....................P 19 46 954.6

[52] U.S. Cl. ....260/2.5 AJ, 260/45.7 R, 260/77.5 SS
[51] Int. Cl...........................C08g 51/58, C08g 41/00
[58] Field of Search ..........260/2.5 AJ, 45.7, 77.5 SS, 260/396

[56] References Cited

UNITED STATES PATENTS

| 3,445,486 | 5/1969 | Schnabel | 260/2.5 X |
| 3,164,558 | 1/1965 | Eichorn | 260/2.5 |

FOREIGN PATENTS OR APPLICATIONS

| 469,051 | 4/1969 | Switzerland | 260/2.5 AK |

*Primary Examiner*—Donald E. Czaja
*Assistant Examiner*—C. Warren Ivy
*Attorney*—Gordon W. Hueschen and Talivaldis Cepuritis

[57] ABSTRACT

Polyurethane-based materials are rendered self-extinguishing by incorporating therein an effective amount of a brominated benzo-quinone.

5 Claims, No Drawings

SELF-EXTINGUISHING POLYURETHANES CONTAINING BROMINATED BENZO-QUINONES

BACKGROUND OF THE INVENTION

The collective name of the polyurethanes comprises a group of plastics which, depending on their individual chemical composition, can have most different properties. Polyurethanes are used to produce non-porous, solid articles, rigid and foamed ones, also elastomers and raw materials for paints.

This great field of application is limited, however, by the fact that polyurethanes are combustible, just like most plastics. Consequently, the use of articles made from polyurethane is impossible where they are exposed to the danger of being ignited and could contribute to the spreading of fires as, for example, in buildings or in electrical appliances.

Numerous attempts have therefore been made to render polyurethanes flame retardant or self-extinguishing. Organic halogen compounds, mainly in combination with organic phosphorus compounds are used for this. In their place also organic phosphorus-halogen-compounds may be employed. Tris-chloroethyl phosphate or tris-dibromo-propyl phosphate, for instance, were tried as flame-proofing compounds for polyurethanes.

Apart from the fact that these halogen containing phosphoric acid esters are easily cleavable by hydrolysis, their effect being thereby reduced considerably, substantial amounts of these compounds must be added to the polyurethanes to obtain sufficient flame resistance. Therefore, depending on the type of compound, for example to flameproof polyurethane soft foams, 10 to 20 percent by weight of additives are necessary to obtain a flame resistance which conforms with ASTM Test 1692.

On the other hand, it has also been attempted to flameproof polyurethanes by introducing additives which only contain halogen. These attempts showed, however, that 20 to 30 percent by weight of known flame-proofing components containing only halogen, are necessary to obtain satisfactory flame resistance. Such relatively large amounts, however, will always have a detrimental effect on the physical or chemical properties of the plastics flameproofed therewith.

Consequently, new substances were searched for, allowing to flameproof plastics, especially polyurethanes, the amounts of these substances being such that the physical and chemical properties of the plastics are not affected to any great extent.

SUMMARY OF THE INVENTION

Self-extinguishing polyurethanes of the present invention are characterized by their contents of brominated quinones, preferably tetrabromoquinone, as flameproofing components.

DESCRIPTION OF THE PREFERRED EMBODIMENTS

It has been found that the addition of 1 to 15 percent by weight, preferably 5 to 10 percent by weight of brominated quinones, particularly tetrabromoquinone, imparts sufficient flame resistance to foamed as well as to non-foamed polyurethanes. Therefore it is not necessary to support the effect of the brominated quinones by the simultaneous incorporation of phosphorus compounds. Should it be desirable, however, for some other reason, to add phosphorus compounds to the plastic material, this can be done without leading to any disadvantages.

The most suitable way of incorporating tetrabromoquinone to the polyurethane to be flameproofed, is the addition of the tetrabromoquinone to the polymer reaction mixture. The fine tetrabromoquinone flakes are suspended in one of the two reaction components employed for polyurethane formation. It is advantageous to choose for this the component having the lower viscosity. It is possible, for example, to produce a self-extinguishing rigid or foamed polyurethane in which the flameproofing component is evenly distributed in the polyether alcohol used for the polyaddition with di-isocyanate.

EXAMPLE 1 a. According to the invention 7 percent by weight of tetrabromoquinone is added to a mixture consisting of di-isocyanates and polyether alcohols, which is foamed by known processes to obtain rigid polyurethane foam. Test samples are cut from this rigid foam to test their flame resistance in accordance with ASTM 1692. It will be found that these samples will extinguish 5 to 12 seconds after removal of the flame.

b. Comparative test

If, in place of tetrabromoquinone, pentabromodiphenylether, for instance, is added to the same mixture, 20 percent by weight of the additive are then necessary to ensure that the samples also extinguish between 5 to 12 seconds after the flame has been removed.

EXAMPLE 2

Tetrabromoquinone and Tris-(dipropylene glycol)-phosphite are added to a reaction mixture prepared for the production of rigid polyurethane foam, the amounts added being such that the final foamed product contains 2 percent by weight of phosphorus and 5 percent by weight of bromine. Seven samples tested extinguished between 1 to 6 seconds after the flame had been removed.

The foregoing discussion is intended as illustrative but not limiting. Still other variations within the spirit and scope of the present invention will readily present themselves to one skilled in the art.

I claim:

1. A self-extinguishing polyurethane material containing a brominated benzoquinone in an amount sufficient to impart flame resistance characteristics to said material.

2. The polyurethane material in accordance with claim 1 containing tetrabromoquinone.

3. The polyurethane material in accordance with claim 1 wherein the brominated quinone is present in an amount in the range from about 1 to about 15 weight percent.

4. The polyurethane material in accordance with claim 1 wherein the brominated quinone is present in an amount in the range from about 5 to about 10 weight percent.

5. The polyurethane material in accordance with claim 1 in the form of a rigid foam.

* * * * *